United States Patent
Held et al.

(10) Patent No.: US 12,423,042 B1
(45) Date of Patent: Sep. 23, 2025

(54) SWITCHING PRESENTATION OF CONTENT BETWEEN DEVICES

(71) Applicant: Apple Inc., Cupertino, CA (US)

(72) Inventors: Robert T. Held, Seattle, WA (US); Luis R. Deliz Centeno, Fremont, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/241,678

(22) Filed: Sep. 1, 2023

Related U.S. Application Data

(60) Provisional application No. 63/409,286, filed on Sep. 23, 2022.

(51) Int. Cl.
| | |
|---|---|
| *G06F 3/14* | (2006.01) |
| *G06F 3/01* | (2006.01) |
| *G06T 3/40* | (2006.01) |
| *G06T 7/00* | (2017.01) |

(52) U.S. Cl.
CPC .......... *G06F 3/1423* (2013.01); *G06F 3/013* (2013.01); *G06T 3/40* (2013.01); *G06T 7/0012* (2013.01); *G06T 2207/30041* (2013.01)

(58) Field of Classification Search
CPC ......... G06F 3/1423; G06F 3/013; G06T 3/40; G06T 7/0012; G06T 2207/30041
See application file for complete search history.

(56) References Cited

U.S. PATENT DOCUMENTS

| | | | |
|---|---|---|---|
| 9,177,355 B1 | 11/2015 | Buchheit | |
| 9,829,970 B2 | 11/2017 | Ellis et al. | |
| 2010/0045569 A1* | 2/2010 | Estevez | H04M 1/0272 345/3.1 |
| 2012/0157114 A1* | 6/2012 | Alameh | H04M 1/72454 455/456.1 |
| 2013/0093796 A1* | 4/2013 | Lee | G09G 5/14 345/204 |
| 2013/0147784 A1* | 6/2013 | Hill | G06T 11/00 345/418 |
| 2014/0282285 A1 | 9/2014 | Sadhvani et al. | |
| 2016/0317025 A1* | 11/2016 | Lee | A61B 5/0022 |
| 2018/0078445 A1* | 3/2018 | Bastide | G16H 50/30 |
| 2018/0088666 A1* | 3/2018 | Ayoub | G06V 40/19 |

\* cited by examiner

*Primary Examiner* — Patrick N Edouard
*Assistant Examiner* — Joseph P Fox
(74) *Attorney, Agent, or Firm* — Fernando & Partners, LLP

(57) ABSTRACT

Various implementations disclosed herein include devices, systems, and methods for switching presentation of content between devices. In some implementations, a method includes obtaining information regarding an eye condition. In some implementations, the method includes determining whether a first display of a first electronic device that is presenting content satisfies a presentation criterion based on the eye condition and a characteristic of the content. In some implementations, the method includes, in accordance with a determination that the first display does not satisfy the presentation criterion, triggering a second electronic device with a second display that satisfies the presentation criterion to present the content.

20 Claims, 10 Drawing Sheets

SWITCHING PRESENTATION OF CONTENT BETWEEN DEVICES

CROSS-REFERENCE TO RELATED APPLICATION

This application claims the benefit of U.S. Provisional Patent App. No. 63/409,286, filed on Sep. 23, 2022, which is incorporated by reference in its entirety.

TECHNICAL FIELD

The present disclosure generally relates to switching presentation of content between devices.

BACKGROUND

Some devices include a display that presents content. Content can include textual content such as an ebook or a blog post, images at various resolutions and/or videos such as movies, TV shows, etc. It can be difficult for a user of a device to view certain content on a device for an extended period of time. For example, it can be difficult for a user to read a relatively long blog post on a smartphone.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
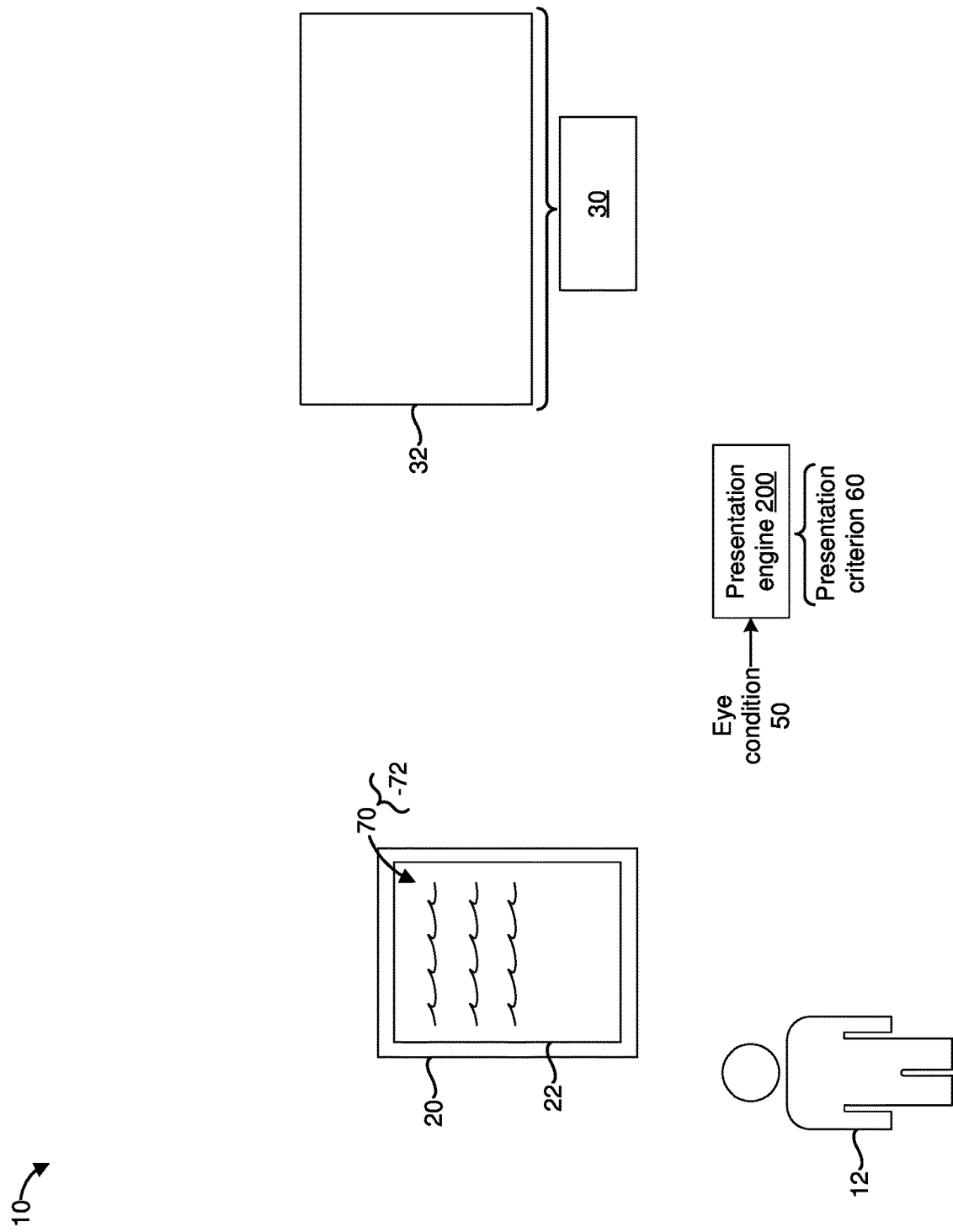
FIGS. 1A-1G are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for switching presentation of content between devices. In some implementations, a method includes obtaining information regarding an eye condition. In some implementations, the method includes determining whether a first display of a first electronic device that is presenting content satisfies a presentation criterion based on the eye condition and a characteristic of the content. In some implementations, the method includes, in accordance with a determination that the first display does not satisfy the presentation criterion, triggering a second electronic device with a second display that satisfies the presentation criterion to present the content.

In accordance with some implementations, a device includes one or more processors, a plurality of sensors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment may include multiple devices that can present the same content. However, a person's eye condition may make it more difficult to view some content on certain devices. For example, a person who is a presbyope (i.e., is farsighted) may not be able to properly view content on a smartphone due to not being able to view content that is displayed too close to the person.

The present disclosure provides methods, systems, and/or devices for switching presentation of content from a first device to a second device based on an eye condition of a person and a characteristic of the content. A content presentation engine determines an eye condition of a person and a characteristic of content that is being presented. The content presentation engine can switch the presentation of content from a first device to a second device based on the eye condition of the person and the characteristic of the content. As an example, for a presbyope who cannot focus on nearby objects, the content presentation engine can switch presentation of textual content from a smartphone to a head-mountable device (HMD) where the virtual image distance can be increased to provide an appearance that the textual content is being displayed farther away. As another example, for a non-presbyope (i.e., is not farsighted) who can focus on nearby objects, the content presentation engine can switch presentation of textual content from the HMD to the smartphone.

FIG. 1A is a diagram that illustrates an example physical environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 10 includes a person 12, a first electronic device 20, a second electronic device 30 and a content presentation engine 200.

The person 12 may be referred to as a user of the first electronic device 20 and/or the second electronic device 30. The content presentation engine 200 may be integrated into the first electronic device 20, the second electronic device 30 and/or another electronic device (not shown).

In various implementations, the first electronic device 20 includes a first display 22 and the second electronic device 30 includes a second display 32. In various implementations, the first electronic device 20 is of a first type and the second electronic device 30 is of a second type that is different from the first type. For example, in some implementations, the first electronic device 20 includes a handheld computing device that can be held by the person 12 and the second electronic device 30 includes a wearable computing device that can be worn by the person 12. For example, the first electronic device 20 may include a smartphone, a tablet, a media player, a laptop or the like that can be held by the person 12, and the second electronic device 30 may include an HMD or an electronic watch that can be worn by the person 12. In some implementations, the first display 22 is of a first size and the second display 32 is of a second size that is different from the first size. In some implementations, the first electronic device 20 is at a first distance from the person 12, and the second electronic device 30 is at a second distance from the person 12 (e.g., the first electronic device 20 may be located farther from or closer to the person 12 than the second electronic device 30). In some implementations, the first display 22 can display content at a first distance and the second display 32 can display content at a second distance (e.g., a virtual image distance) that is different from the first distance (e.g., the second distance may be greater than or shorter than the first distance).

In various implementations, the content presentation engine 200 presents content 70 on the first display 22 of the first electronic device 20. In some implementations, the content 70 is associated with a characteristic 72. In some implementations, the characteristic 72 indicates a type of the content 70. For example, the characteristic 72 may indicate whether the content 70 includes textual content such as an ebook or a blog post, graphic content such as a picture, or video content such as a movie or a TV show. In some implementations, the characteristic 72 indicates a size of the content 70. For example, the characteristic 72 may indicate a resolution of the content 70 (e.g., 1080P, 4K, etc.), a font size of the content 70, etc.

In various implementations, the content presentation engine 200 obtains information regarding an eye condition 50 (hereafter "eye condition information 50") of the person 12 that may be viewing the content 70 displayed on the first display 22 of the first electronic device 20. In some implementations, the eye condition information 50 indicates whether or not the person 12 viewing the content 70 has presbyopia (e.g., age-related farsightedness). For example, the eye condition information 50 indicates whether or not the person 12 can readily view nearby objects (e.g., objects that are positioned within a threshold distance of the person 12). In some implementations, the eye condition information 50 includes eye prescription data. For example, the eye condition information 50 may include numerical values for a sphere (SPH) parameter indicating an amount of lens power required to correct (e.g., compensate for) nearsightedness or farsightedness, a cylinder (CYL) parameter indicating an amount of lens power needed to correct astigmatism and an axis parameter. In some implementations, the eye condition information 50 includes a numerical value for an 'add' parameter indicating a magnifying power applied to a lens to correct presbyopia.

In various implementations, the eye condition information 50 indicates a current physiological condition of an eye of the person 12. In some implementations, the eye condition information 50 indicates a number of blinks for the eye (e.g., a number of times that the eye has blinked within a given amount of time). In some implementations, the eye condition information 50 indicates whether or not the eye is squinting. In some such implementations, the eye condition information 50 may indicate an amount of squinting by the eye. In some implementations, the eye condition information 50 indicates an amount of strain being exerted by the eye (e.g., based on the amount of squinting and/or a frequency of eye blinks). In some implementations, the eye condition information 50 indicates whether one of the eyes is currently being lazy. For example, the eye condition information 50 indicates whether one eye is moving at a different speed than the other eye.

In some implementations, the content presentation engine 200 retrieves the eye condition information 50 from an application installed on the first electronic device 20 and/or the second electronic device 30 (e.g., a health application, a fitness application, a medical records application, etc.). In some implementations, the content presentation engine 200 determines the eye condition information 50 based on an image of an eye of the person 12. For example, the first electronic device 20 and/or the second electronic device 30 may include an image sensor that captures the image, and the content presentation engine 200 determines the eye condition information 50 by analyzing the image. As an example, the content presentation engine 200 can count a number of eye blinks detected across a series of images captured by the image sensor. In some implementations, the content presentation engine 200 determines the eye condition information 50 based on an input (e.g., a user input specified by the person 12). For example, the person 12 may provide a user input indicating whether or not the person 12 is able to properly view the content 70 being displayed on the first display 22.

In various implementations, the content presentation engine 200 determines whether the first display 22 of the first electronic device 20 satisfies a presentation criterion 60 based on a spatial relationship between the person 12 and the first display 22, the eye condition information 50 and the characteristic 72 of the content 70. In some implementations, the first display 22 satisfying the presentation criterion 60 is an indication that the person 12 can likely properly view the content 70 being presented on the first display 22. By contrast, the first display 22 not satisfying the presentation criterion 60 may be an indication that the person 12 cannot properly view the content 70 displayed on the first display 22.

Figure 1B:
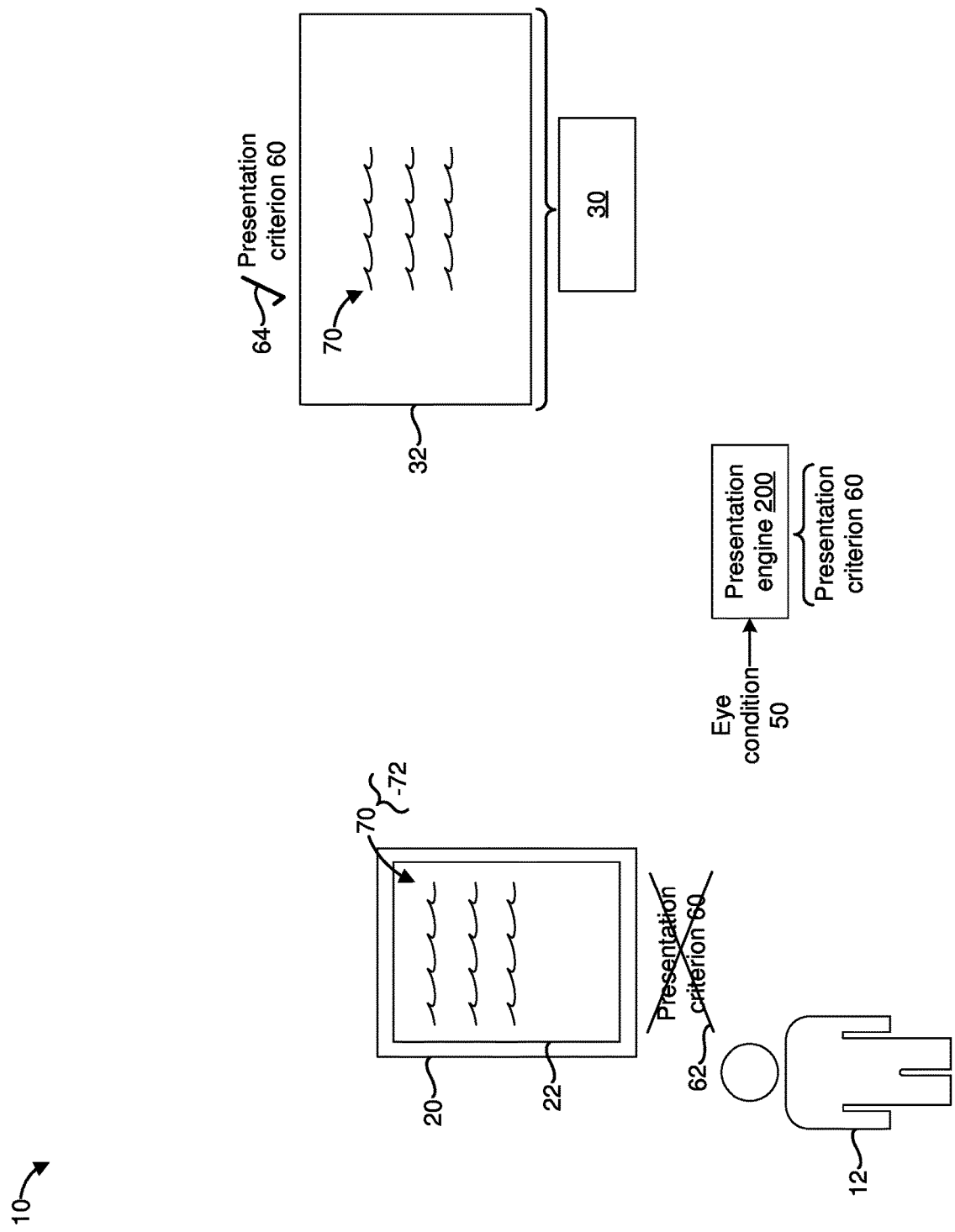

Referring to FIG. 1B, as indicated by a cross 62, the content presentation engine 200 determines that the first display 22 does not satisfy the presentation criterion 60. The first electronic device 20 not satisfying the presentation criterion 60 indicates that the person 12 may not be able to properly view the content 70 displayed on the first display 22. Furthermore, as indicated by a checkmark 64, the content presentation engine 200 determines that the second display 32 satisfies the presentation criterion 60. As such, the content presentation engine 200 displays the content 70 on the second display 32. The second display 32 satisfying the presentation criterion 60 indicates that the person 12 can likely properly view the content 70 displayed on the second display 32. Triggering the second display 32 to display the content 70 in response to determining that the first display 22 does not satisfy the presentation criterion 60 allows the person 12 to properly view the content 70 thereby enhancing a user experience of the person 12.

In some implementations, the eye condition information 50 indicates that the person 12 has presbyopia (e.g., age-related farsightedness), and the presentation criterion 60 specifies a threshold distance within which the person 12 may not be able to properly view objects due to the presbyopia. In such implementations, the content presentation engine 200 determines that the first display 22 does not satisfy the presentation criterion 60 because a first distance between the first electronic device 20 and the person 12 is less than the threshold distance. Since the first electronic device 20 is positioned too close to the person 12, the person 12 may not be able to properly view the content 70 due to his/her presbyopia. By contrast, the content presentation engine 200 may determine that the second display 32 satisfies the presentation criterion 60 because a second distance between the second electronic device 30 and the person 12 is greater than the threshold distance. Since the second electronic device 30 is positioned far enough from the person 12, the person 12 will likely be able to properly view the content 70 on the second display 32. The threshold distance may be specific to the person 12. For example, the threshold distance may be a function of a degree of the presbyopia of the person 12. As an example, the threshold distance may be a function of a value of the 'add' parameter in eye prescription data that specifies a magnifying power to correct for presbyopia.

In some implementations, the content presentation engine 200 determines whether the first display 22 satisfies the presentation criterion 60 based on (e.g., based further on) the characteristic 72 of the content 70. In some implementations, the first display 22 may be suitable to present the content 70 when the characteristic 72 has a first value and the first display 22 may not be suitable to present the content 70 when the characteristic 72 has a second value. For example, the presentation criterion 60 may specify that a first type of content can only be presented on displays that are within a first size range and a second type of content can be presented on displays of any size. In this example, the content presentation engine 200 may determine that the first display 22 does not satisfy the presentation criterion 60 because the characteristic 72 indicates that the content 70 is of the first type of content and the first display 22 is not within the first size range (e.g., the first display 22 may be too small to present the first type of content, for example, the first display 22 may be too small to view a relatively long piece of text such as a lengthy blog post).

Figure 1C:
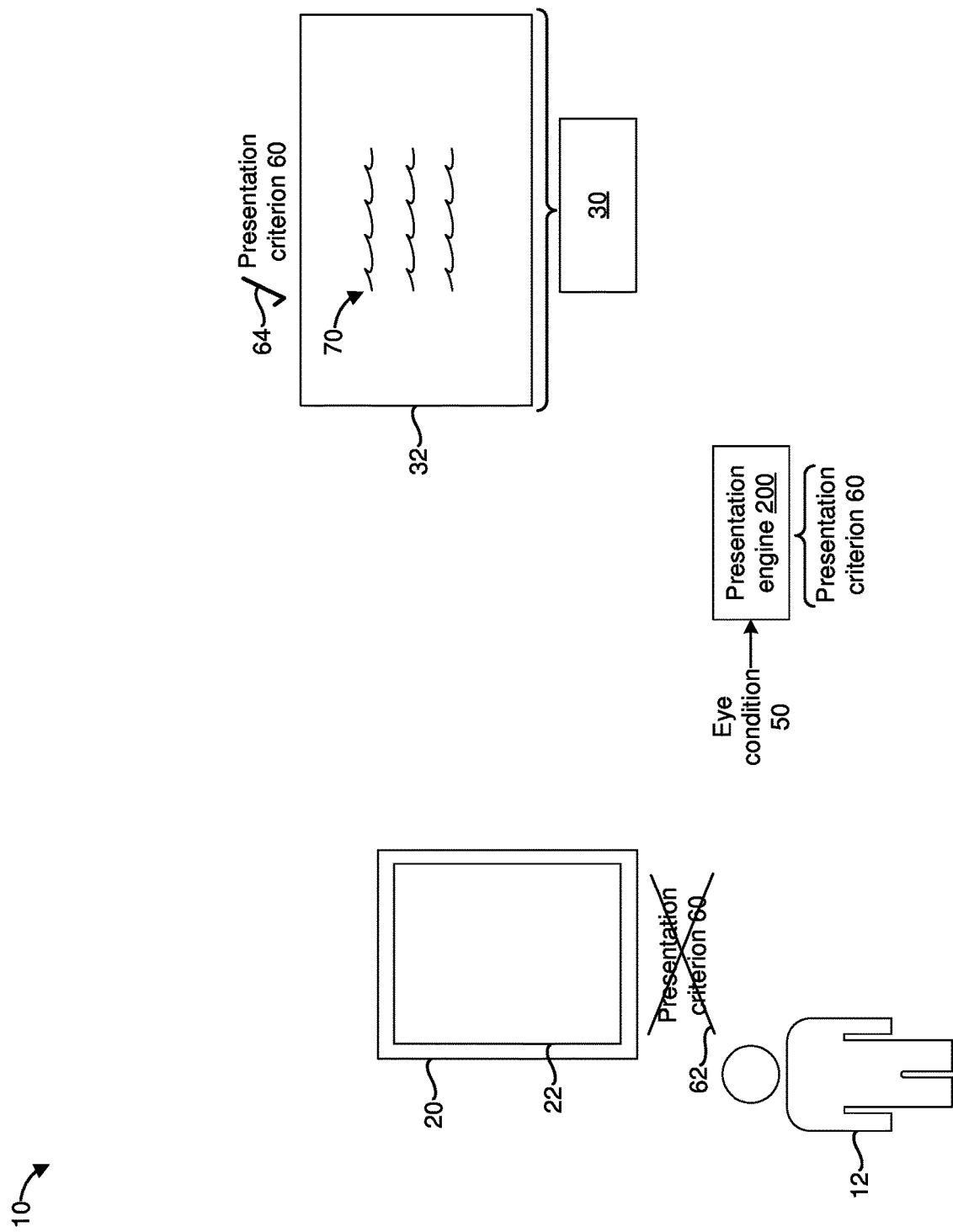

In the example of FIG. 1B, the first display 22 continues presenting the content 70 even though the first display 22 does not satisfy the presentation criterion 60. Since the content presentation engine 200 has triggered the second display 32 to display the content 70, the person 12 can view the content 70 on the second display 32 instead of the first display 22. However, as shown in FIG. 1C, in some implementations, the content presentation engine 200 causes the first display 22 to cease presenting the content 70 in response to determining that the first display 22 does not satisfy the presentation criterion 60. Ceasing presentation of the content 70 on the first display 22 reduces a power consumption of the first electronic device 20 thereby extending a battery life of the first electronic device 20.

Figure 1D:
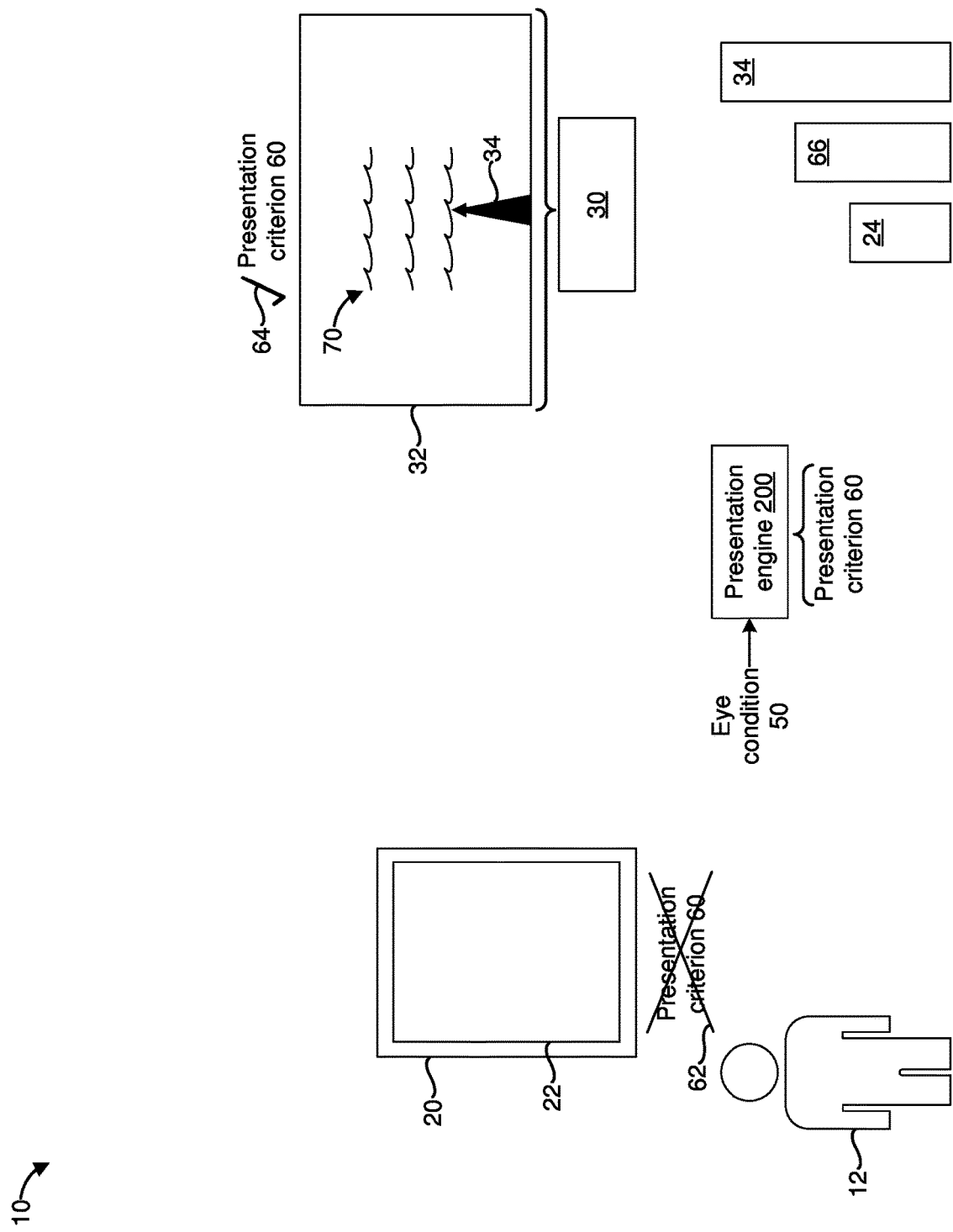

Referring to FIG. 1D, in some implementations, the content presentation engine 200 determines that the first display 22 does not satisfy the presentation criterion 60 because a first device distance 24 between the first electronic device 20 and the person 12 is less than a distance threshold 66 specified by the presentation criterion 60. For example, the person 12 may be a presbyope and the presbyopia may prevent the person 12 from properly viewing the content 70 on the first display 22 because the first electronic device 20 is positioned too close to the person 12. In some implementations, the first electronic device 20 is a handheld computing device and the second electronic device 30 is an HMD. As such, the second electronic device 30 may be positioned even closer to the person 12 than the first electronic device 20 (e.g., because the person 12 is likely wearing the HMD on his/her head). However, the content presentation engine 200 can cause the second electronic device 30 to display the content 70 at a virtual image distance 34 that is greater than the distance threshold 66. Hence, even though a physical distance between the second display 32 and the person 12 may be less than the first device distance 24, the virtual image distance 34 provides an appearance that the content 70 is being displayed much farther away and the person 12 is able to properly view the content 70 on the second display 32.

Figure 1E:
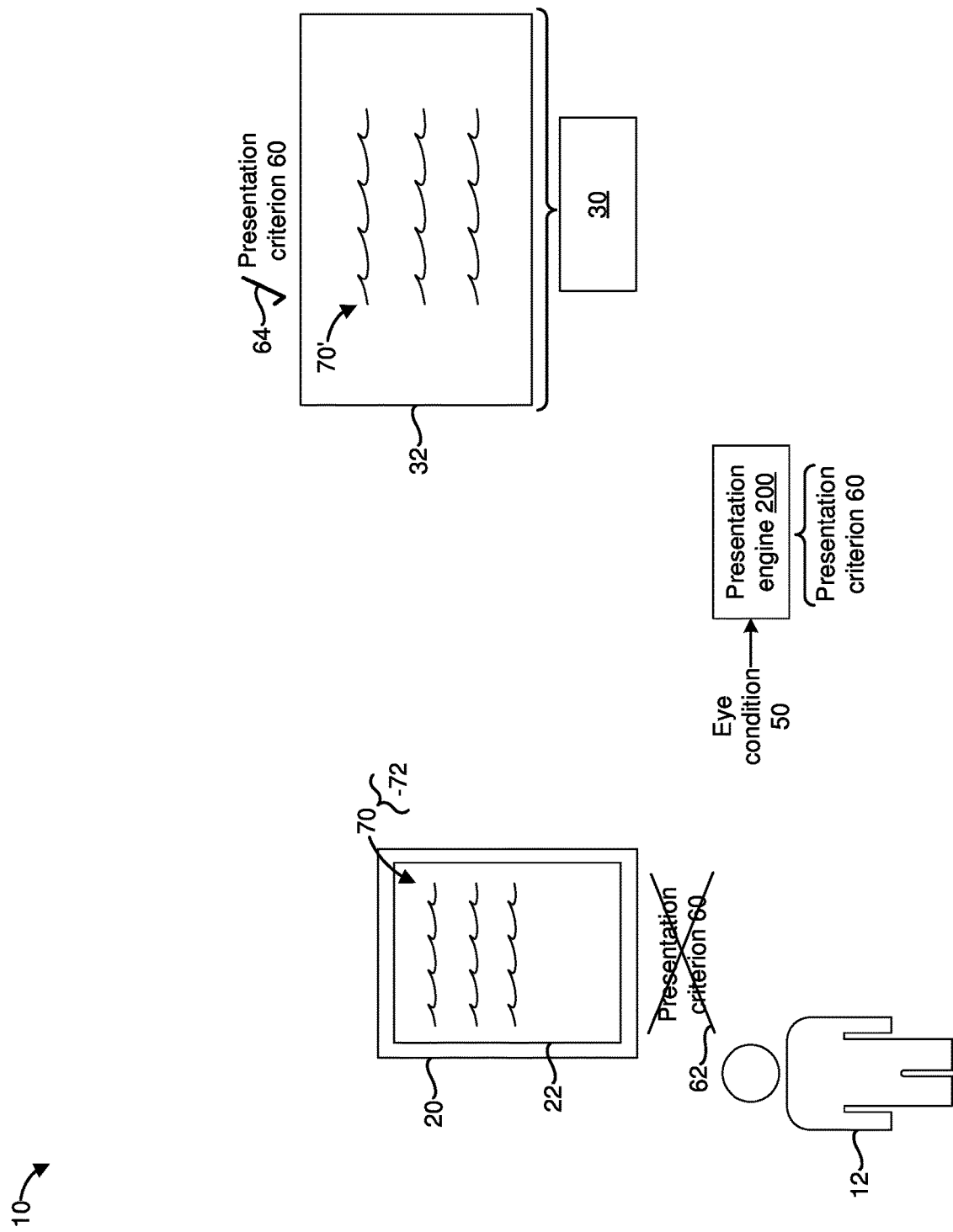

Referring to FIG. 1E, in some implementations, the content presentation engine 200 causes the second electronic device 30 to display modified content 70' (e.g., instead of the content 70). The modified content 70' is a modified version of the content 70. In some implementations, the content presentation engine 200 and/or the second electronic device 30 generate the modified content 70' by increasing a size of the content 70. For example, the content presentation engine 200 and/or the second electronic device 30 increase a text size of text that is a part of the content 70 in order to increase a readability of the text. As another example, the content presentation engine 200 and/or the second electronic device 30 change a resolution of the content 70. If a display area of the second display 32 is greater than a display area of the first display 22, the second electronic device 30 can increase the resolution of the content 70. As an example, the content 70 may have a resolution that corresponds to 1080P and the modified content 70' may have a resolution that corresponds to 4K. The first display 22 may continue displaying the content 70 or the first display 22 may cease displaying the content 70 in order to conserve power.

Figure 1F:
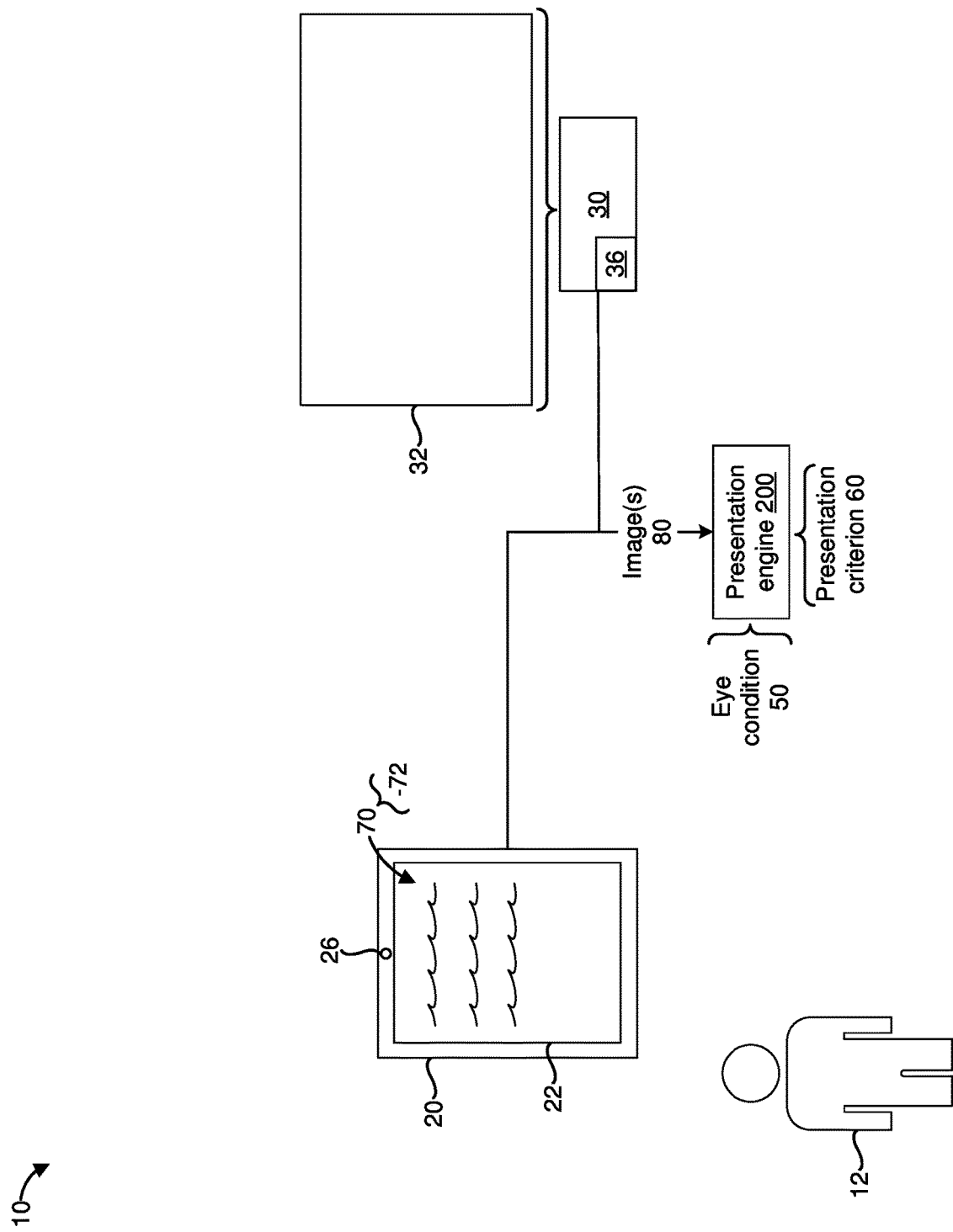

Referring to FIG. 1F, in some implementations, the content presentation engine 200 determines the eye condition information 50 based on a set of one or more images 80 of an eye of the person 12. In some implementations, the first electronic device 20 includes a first image sensor 26 that captures the image(s) 80 and provides the image(s) 80 to the content presentation engine 200. Alternatively or additionally, in some implementations, the second electronic device 30 includes a second image sensor 36 that captures the image(s) 80 and provides the image(s) 80 to the content presentation engine 200 for analysis.

In some implementations, the content presentation engine 200 utilizes the image(s) 80 to determine a current physiological condition of the eye(s) of the person 12. For example, the content presentation engine 200 can utilize the image(s) 80 to determine a first blinking frequency of the eye(s) while the person 12 is viewing the content 70 on the first display 22. In this example, if the first blinking frequency is greater than a threshold blinking frequency specified by the presentation criterion 60, the content presentation engine 200 may determine that the first display 22 does not satisfy the presentation criterion 60 and the content presentation engine 200 triggers the second display 32 to display the content 70. After triggering the second display 32 to display the content 70, the content presentation engine 200 can measure a second blinking frequency of the eye(s) while the person 12 is viewing the content 70 on the second display 32. If the second blinking frequency is greater than the threshold blinking frequency, the content presentation engine 200 may determine that the second display 32 satisfies the presentation criterion 60.

As another example, the content presentation engine 200 can utilize the image(s) 80 to determine a first amount of squinting of the eye(s) while the person 12 is viewing the content 70 on the first display 22. In this example, if the first amount of squinting is greater than a threshold squinting amount specified by the presentation criterion 60, the content presentation engine 200 may determine that the first display 22 does not satisfy the presentation criterion and the content presentation engine 200 triggers the second display 32 to display the content 70. After triggering the second display 32 to display the content 70, the content presentation engine 200 can measure a second amount of squinting of the eye(s) while the person 12 is viewing the content 70 on the second display 32. If the second amount of squinting is less than the threshold squinting amount, the content presentation engine 200 may determine that the second display 32 satisfies the presentation criterion 60.

As yet another example, the content presentation engine 200 can utilize the image(s) 80 to determine a first amount of eye strain on the eye(s) of the person 12 while the person 12 is viewing the content 70 on the first display 22. In this example, if the first amount of eye strain is greater than a threshold level of eye strain specified by the presentation criterion 60, the content presentation engine 200 may determine that the first display 22 does not satisfy the presentation criterion 60 and the content presentation engine 200 triggers the second display 32 to display the content 70. After triggering the second display 32 to display the content 70, the content presentation engine 200 can measure a second amount of eye strain on the eye(s) while the person 12 is viewing the content 70 on the second display 32. If the second amount of eye strain is less than the threshold amount of eye strain, the content presentation engine 200 may determine that the second display 32 satisfies the presentation criterion 60.

Figure 1G:
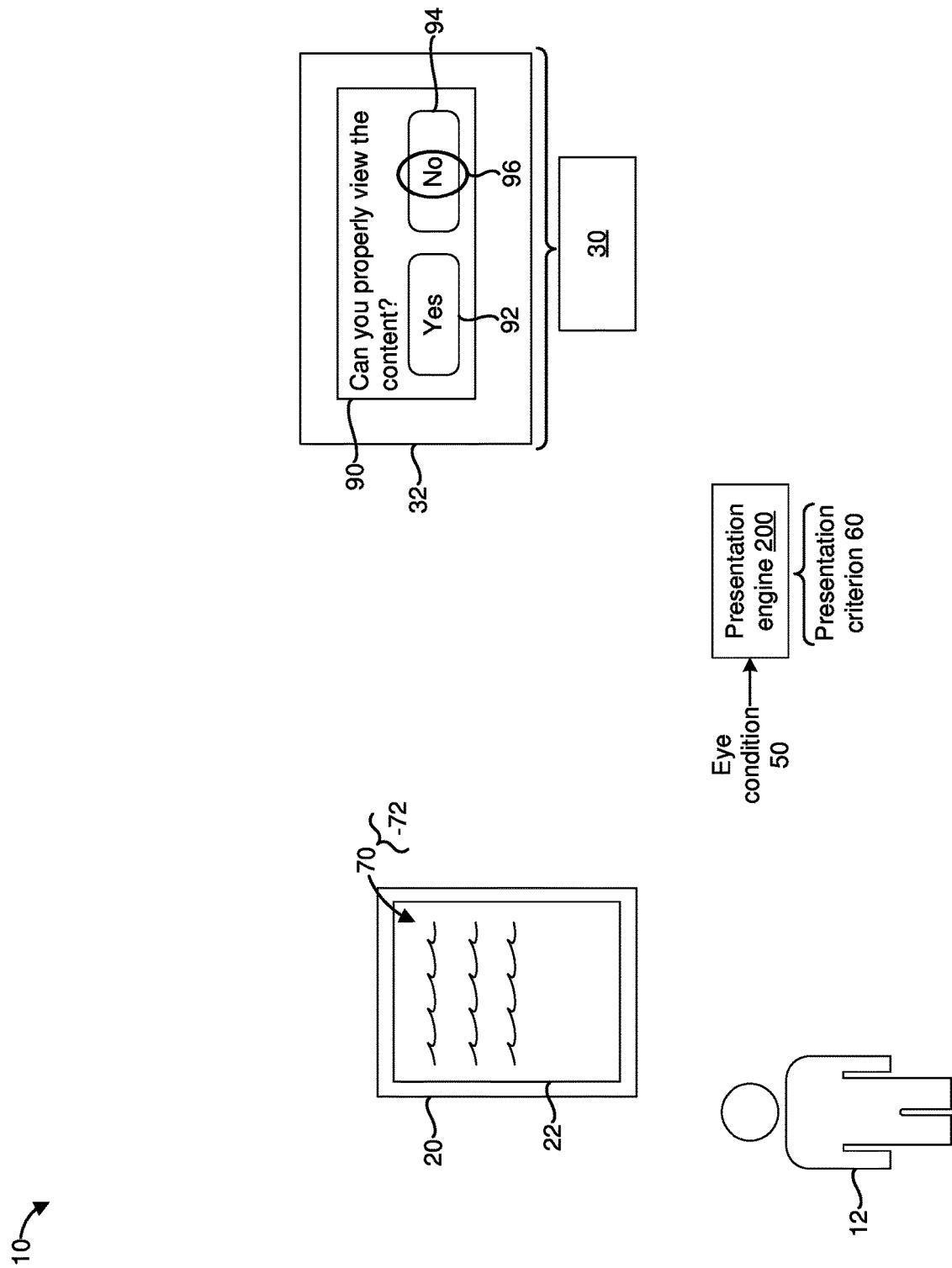

Referring to FIG. 1G, in various implementations, the content presentation engine 200 determines the eye condition information 50 based on an input (e.g., a set of one or more user inputs provided by the person 12). Referring to FIG. 1G, in some implementations, the content presentation engine 200 causes the first electronic device 20 and/or the second electronic device 30 to display a prompt 90. As shown in FIG. 1G, the prompt 90 may request the person 12 to indicate whether the person 12 is properly able to view the content 70 on the first display 22. In the example of FIG. 1G, the prompt 90 includes a yes affordance 92 to indicate that the person 12 can properly view the content 70 on the first display 22 and a no affordance 94 to indicate that the person 12 cannot properly view the content 70 on the first display 22. In the example of FIG. 1G, the content presentation engine 200 (e.g., the second electronic device 30) detects a user input 96 directed to the no affordance 94. In some implementations, the presentation criterion 60 specifies that a selection of the no affordance 94 indicates that the first display 22 does not satisfy the presentation criterion 60. As such, the content presentation engine 200 can cause the second electronic device 30 to display the content 70 in response to detecting the user input 96 directed to the no affordance 94.

In some implementations, the content presentation engine 200 can cause the first electronic device 20 and/or the second electronic device 30 to display a series of screens that correspond to conducting an eye examination of the person 12. For example, the content presentation engine 200 can cause the first electronic device 20 and/or the second electronic device 30 to display an object and request the person 12 to indicate whether the object is more clearly visible through a first virtual lens or a second virtual lens. As another example, the content presentation engine 200 can cause the first electronic device 20 and/or the second electronic device 30 to display rows of letters and request the person 12 to read aloud letters from a particular line. The content presentation engine 200 may utilize a result of the eye examination to generate the eye condition information 50. For example, the content presentation engine 200 may utilize the result of the eye examination to determine values for the SPH, CYL, axis and 'add' parameters that are a part of eye prescription data.

Figure 2:
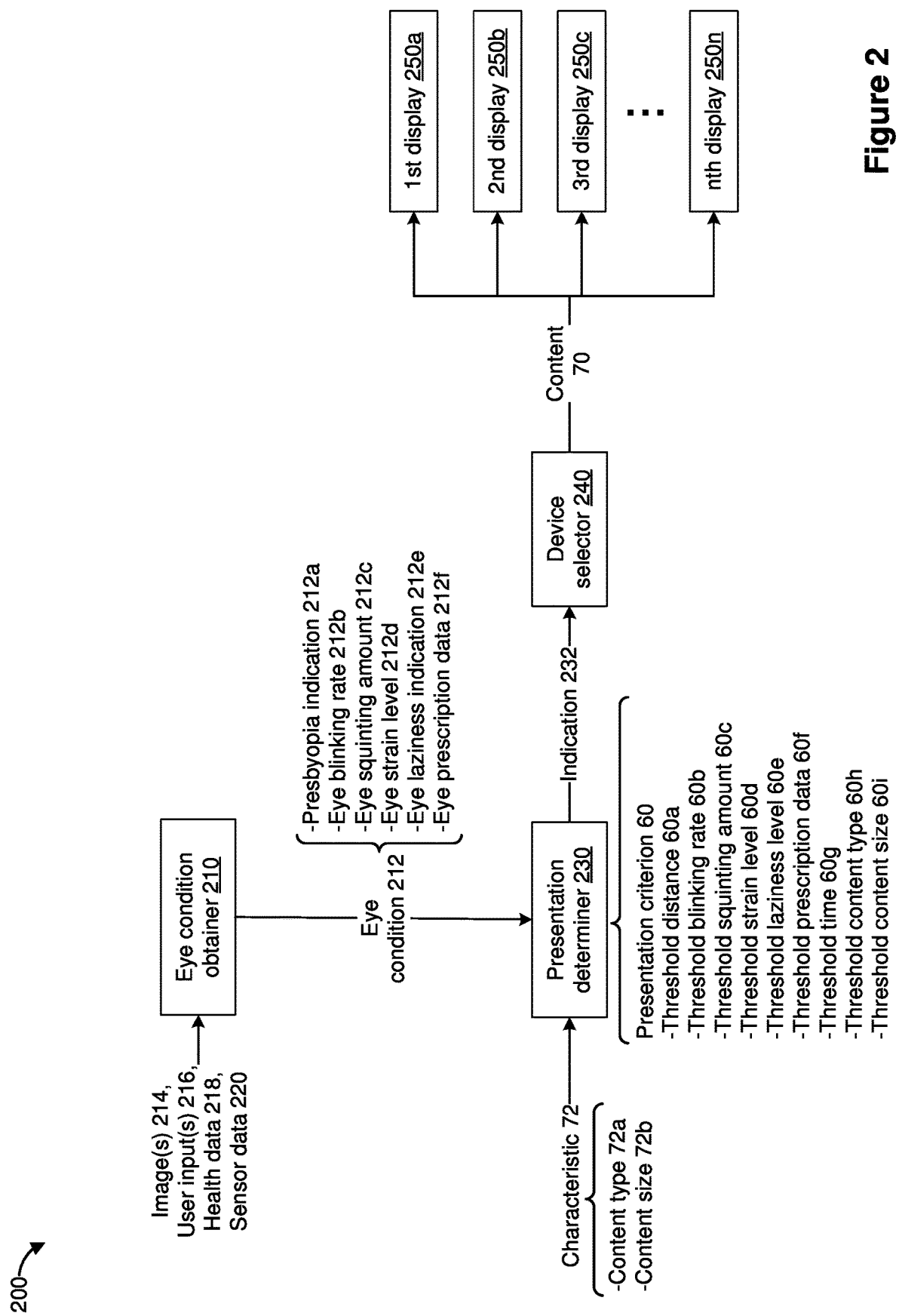
FIG. 2 is a diagram of a content presentation engine in accordance with some implementations.

FIG. 2 is a block diagram of the content presentation engine 200 in accordance with some implementations. In some implementations, the content presentation engine 200 resides at (e.g., is implemented by) the first electronic device 20 shown in FIGS. 1A-1G. In some implementations, the content presentation engine 200 resides at (e.g., is implemented by) the second electronic device 30 shown in FIGS. 1A-1G. In some implementations, the content presentation engine 200 resides at the first electronic device 20 and the second electronic device 30. For example, a first portion of the content presentation engine 200 is implemented by the first electronic device 20 and a second portion of the content presentation engine 200 is implemented by the second electronic device 30. In some implementations, the content presentation engine 200 resides at a third electronic device that is different from the first electronic device 20 and the second electronic device 30. For example, the content presentation engine 200 may reside at a laptop computer, a desktop computer, a server or a cloud computing platform.

In various implementations, the content presentation engine 200 includes an eye condition obtainer 210, a presentation determiner 230 and a device selector 240. Additionally, FIG. 2 illustrates a first display 250a, a second display 250b, a third display 250c, . . . , and an nth display 250n. At least one of the displays 250a, 250b, . . . , and 250n may currently be presenting the content 70. Briefly, in various implementations, the eye condition obtainer 210 obtains information regarding an eye condition 212, the presentation determiner 230 determines whether a first one of the displays 250a, 250b, . . . , and 250n that is currently presenting the content 70 satisfies the presentation criterion 60, and the device selector 240 selects a second one of the displays 250a, 250b, . . . , and 250n in response to the presentation determiner 230 determining that the first one of the displays 250a, 250b, . . . , and 250n does not satisfy the presentation criterion 60.

In various implementations, the eye condition obtainer 210 obtains information regarding an eye condition 212 of a person in a physical environment. For example, the eye condition obtainer 210 obtains the eye condition information 50 shown in FIGS. 1A-1G. In some implementations, the eye condition obtainer 210 determines the eye condition 212 based on one or more images 214 (e.g., the image(s) 80 shown in FIG. 1F) of an eye. In some implementations, the eye condition 212 includes a presbyopia indication 212a that indicates whether the person 12 is a presbyope (e.g., has presbyopia) or a non-presbyope (e.g., does not have presbyopia). In some implementations, the eye condition 212 includes an eye blinking rate 212b that indicates a blinking frequency of an eye of the person 12 while viewing the content 70 on the first one of the displays 250a, 250*b*, . . . , and 250*n*. In some implementations, the eye condition 212 includes an eye squinting amount 212*c* that indicates an amount that an eye of the person 12 is squinting while viewing the content 70 on the first one of the displays 250*a*, 250*b*, . . . , and 250*n*. In some implementations, the eye condition 212 includes an eye strain level 212*d* that indicates a level of eye strain of the eye of the person 12 while viewing the content on the first one of the displays 250*a*, 250*b*, . . . , and 250*n*. In some implementations, the eye condition 212 includes an eye laziness indication 212*e* that indicates whether one of the eyes of the person 12 is lazy (e.g., is moving slower than another eye) while viewing the content 70 on the first one of the displays 250*a*, 250*b*, . . . , and 250*n*. In some implementations, the eye condition 212 includes eye prescription data 212*f* (e.g., values for the SPH, CYL, axis and 'add' parameters).

In some implementations, the eye condition obtainer 210 determines the eye condition 212 based on a set of one or more user inputs 216 (e.g., based on the user input 96 shown in FIG. 1G). For example, the user input(s) 216 may specify whether the person 12 is able to properly view the content 70 displayed on the first display 250*a*. In some implementations, the eye condition obtainer 210 determines the eye condition 212 based on health data 218. The eye condition obtainer 210 can retrieve the health data 218 from a health application, a fitness application, a healthcare management application, etc. In some implementations, the eye condition obtainer 210 determines the eye condition 212 based on sensor data 220 captured by one or more sensors of the first electronic device 20 and/or the second electronic device 30. For example, the eye condition 212 may indicate that the content 70 displayed on the first display 250*a* is not visible to the person 12 when the sensor data 220 indicates that the person 12 is moving the first display 250*a* away from himself/herself (e.g., in order to increase a distance between the first display 250*a* and himself/herself to view the content 70, for example, in order to compensate for presbyopia).

In some implementations, the presentation determiner 230 determines whether a first one of the displays 250*a*, 250*b*, . . . , and 250*n* that is currently displaying the content 70 satisfies the presentation criterion 60. For example, if the first display 250*a* is currently presenting the content 70, the presentation determiner 230 determines whether the first display 250*a* satisfies the presentation criterion 60. In some implementations, the presentation determiner 230 generates an indication 232 to indicate whether or not the first one of the displays 250*a*, 250*b*, . . . , and 250*n* satisfies the presentation criterion 60. For example, the indication 232 may include a binary value where a value of '1' indicates that the first display 250*a* satisfies the presentation criterion 60 and a value of '0' indicates that the first display 250*a* does not satisfy the presentation criterion 60.

In some implementations, the first display 250*a* is currently displaying the content 70 and the presbyopia indication 212*a* indicates that the person 12 has presbyopia. In such implementations, the presentation determiner 230 determines whether a distance between the first display 250*a* and the person 12 exceeds a threshold distance 60*a*. If the distance between the first display 250*a* and the person 12 exceeds the threshold distance 60*a*, the presentation determiner 230 generates an indication 232 indicating that the first display 250*a* satisfies the presentation criterion 60. If the distance between the first display 250*a* and the person 12 is less than the threshold distance 60*a*, the indication 232 indicates that the first display 250*a* does not satisfy the presentation criterion 60.

In some implementations, the presentation determiner 230 determines whether the eye blinking rate 212*b* is greater than a threshold blinking rate 60*b* while the person 12 is viewing the content 70 on the first display 250*a*. If the eye blinking rate 212*b* is greater than the threshold blinking rate 60*b*, the indication 232 indicates that the first display 250*a* does not satisfy the presentation criterion 60. If the eye blinking rate 212*b* is less than the threshold blinking rate 60*b*, the indication 232 indicates that the first display 250*a* satisfies the presentation criterion 60. The eye blinking rate 212*b* being greater than the threshold blinking rate 60*b* may indicate that the person 12 is not able to properly view the content 70 on the first display 250*a*. By contrast, the eye blinking rate 212*b* being less than the threshold blinking rate 60*b* may indicate that the person 12 is able to properly view the content 70 on the first display 250*a*.

In some implementations, the presentation determiner 230 determines whether the eye squinting amount 212*c* is greater than a threshold squinting amount 60*c* while the person 12 is viewing the content 70 on the first display 250*a*. If the eye squinting amount 212*c* is greater than the threshold squinting amount 60*c*, the indication 232 indicates that the first display 250*a* does not satisfy the presentation criterion 60. If the eye squinting amount 212*c* is less than the threshold squinting amount 60*c*, the indication 232 indicates that the first display 250*a* satisfies the presentation criterion 60. The eye squinting amount 212*c* being greater than the threshold squinting amount 60*c* may indicate that the person 12 is not able to properly view the content 70 on the first display 250*a*. By contrast, the eye squinting amount 212*c* being less than the threshold squinting amount 60*c* may indicate that the person 12 is able to properly view the content 70 on the first display 250*a*.

In some implementations, the presentation determiner 230 determines whether the eye strain level 212*d* is greater than a threshold strain level 60*d* while the person 12 is viewing the content 70 on the first display 250*a*. If the eye strain level 212*d* is greater than the threshold strain level 60*d*, the indication 232 indicates that the first display 250*a* does not satisfy the presentation criterion 60. If the eye strain level 212*d* is less than the threshold strain level 60*d*, the indication 232 indicates that the first display 250*a* satisfies the presentation criterion 60. The eye strain level 212*d* being greater than the threshold strain level 60*d* may indicate that the person 12 is not able to properly view the content 70 on the first display 250*a*. By contrast, the eye strain level 212*d* being less than the threshold strain level 60*d* may indicate that the person 12 is able to properly view the content 70 on the first display 250*a*.

In some implementations, the presentation determiner 230 determines whether the eye laziness indication 212*e* indicates that a laziness of an eye of the person 12 is greater than a threshold laziness level 60*e* while the person 12 is viewing the content 70 on the first display 250*a*. If the laziness is greater than the threshold laziness level 60*e*, the indication 232 indicates that the first display 250*a* does not satisfy the presentation criterion 60. If the laziness is less than the threshold laziness level 60*e*, the indication 232 indicates that the first display 250*a* satisfies the presentation criterion 60. The laziness of the eye being greater than the threshold laziness level 60*e* may indicate that the person 12 is not able to properly view the content 70 on the first display 250*a*. By contrast, the laziness of the eye being less than the threshold laziness level 60*e* may indicate that the person 12 is able to properly view the content 70 on the first display 250*a*.

In some implementations, the presentation determiner 230 determines whether the eye prescription data 212*f* indicates lens parameter values that are within an acceptability threshold of (e.g., similar to) lens parameter values indicated by threshold prescription data 60f. If the lens parameter values indicated by the eye prescription data 212f are within the acceptability threshold of lens parameter values indicated by the threshold prescription data 60f, the indication 232 indicates that the first display 250a satisfies the presentation criterion 60. If the lens parameter values indicated by the eye prescription data 212f are not within the acceptability threshold of lens parameter values indicated by the threshold prescription data 60f, the indication 232 indicates that the first display 250a does not satisfy the presentation criterion 60. The eye prescription data 212f being outside the acceptability threshold of the threshold prescription data 60f may indicate that the person 12 is not able to properly view the content 70 on the first display 250a. By contrast, the eye prescription data 212f being within the acceptability threshold of the threshold prescription data 60f may indicate that the person 12 is able to properly view the content 70 on the first display 250a.

In some implementations, the presentation determiner 230 determines whether the first display 250a has not satisfied the presentation criterion 60 (e.g., the threshold distance 60a, the threshold blinking rate 60b, the threshold squinting amount 60c, the threshold strain level 60d and/or the threshold laziness level 60e) for more than a threshold time 60g. If the first display 250a breaches (e.g., does not satisfy) the presentation criterion 60 for more than the threshold time 60g, the indication 232 indicates that the first display 250a does not satisfy the presentation criterion 60. If the first display 250a breaches the presentation criterion for less than the threshold time 60g, the indication 232 indicates that the first display 250a satisfies the presentation criterion 60. As such, in some implementations, the presentation determiner 230 allows the first display 250a to breach the presentation criterion 60 for the threshold time 60g. In other words, a temporary breach (e.g., a breach that lasts less than the threshold time 60g) of the presentation criterion 60 may not trigger switching the presentation of the content 70 from a first one of the displays 250a, 250b, . . . , and 250n to a second one of the displays 250a, 250b, . . . , and 250n.

In some implementations, the presentation determiner 230 determines whether a content type 72a of the content 70 matches a threshold content type 60h. If the content type 72a matches the threshold content type 60h and the first display 250a breaches one of the other presentation criterion 60 (e.g., the threshold distance 60a, the threshold blinking rate 60b, the threshold squinting amount 60c, the threshold strain level 60d and/or the threshold laziness level 60c), the indication 232 indicates that the first display 250a does not satisfy the presentation criterion 60. If the content type 72a does not match the threshold content type 60h, the indication 232 may indicate that the first display 250a satisfies the presentation criterion 60 even though one of the other presentation criterion 60 may have been breached. As an example, the eye blinking rate 212b being above the threshold blinking rate 60b results in the presentation criterion 60 being breached when the content type 72a is textual and not when the content type 72a is video. In other words, a breach of the presentation criterion 60 may not trigger switching the presentation of the content 70 from a first one of the displays 250a. 250b, . . . , and 250n to a second one of the displays 250a, 250b, . . . , and 250n when the content type 72a does not match the threshold content type 60h.

In some implementations, the presentation determiner 230 determines whether a content size 72b of the content 70 is less than a threshold content size 60i. If the content size 72b is less than the threshold content size 60i and the first display 250a breaches one of the other presentation criterion 60 (e.g., the threshold distance 60a, the threshold blinking rate 60b, the threshold squinting amount 60c, the threshold strain level 60d and/or the threshold laziness level 60c), the indication 232 indicates that the first display 250a does not satisfy the presentation criterion 60. If the content size 72b is greater than the threshold content size 60i, the indication 232 may indicate that the first display 250a satisfies the presentation criterion 60 even though one of the other presentation criterion 60 may have been breached. As an example, the eye squinting amount 212c being above the threshold squinting amount 60c results in the presentation criterion 60 being breached when the content size 72b is less than the threshold content size 60i and not when the content size 72b is greater than the threshold content size 60i. In other words, a breach of the presentation criterion 60 may not trigger switching the presentation of the content 70 from a first one of the displays 250a, 250b, . . . , and 250n to a second one of the displays 250a, 250b, . . . , and 250n when the content size 72b is greater than the threshold content size 60i.

In various implementations, the device selector 240 selects a second one of the displays 250a, 250b, . . . , and 250n to display the content 70 when the indication 232 indicates that the first one of the displays 250a, 250b, . . . , and 250n currently displaying the content 70 does not satisfy the presentation criterion 60. For example, the device selector 240 may select the second display 250b to display the content 70 when the indication 232 indicates that the first display 250a does not satisfy the presentation criterion 60. In some implementations, the device selector 240 requests the presentation determiner 230 to determine which of the displays 250a, 250b, . . . , and 250n satisfies the presentation criterion 60. The presentation determiner 230 may provide the device selector 240 with a list that includes a subset of the displays 250a, 250b, . . . , and 250n, and the device selector 240 may select one of the displays 250a, 250b, . . . , and 250n from the list. In some implementations, the device selector 240 selects a largest one of the displays 250a, 250b, . . . , and 250n that satisfies the presentation criterion 60 to display the content 70. In some implementations, the device selector 240 selects a closest one of the displays 250a, 250b, . . . , and 250n to the person 12 that satisfies the presentation criterion 60 to display the content 70. In some implementations, the device selector 240 triggers the second one of the displays 250a, 250b, and 250n to display the content 70. For example, the device selector 240 may send control signal data to the second display 250b instructing the second display 250b to start displaying the content 70. In some implementations, the device selector 240 triggers the first one of the displays 250a, 250b, . . . , and 250n that is currently displaying the content 70 and does not satisfy the presentation criterion 60 to cease displaying the content 70. For example, the device selector 240 may send control signal data to the first display 250a instructing the first display 250a to cease displaying the content 70 in response to the indication 232 indicating that the first display 250a does not satisfy the presentation criterion 60.

Figure 3:
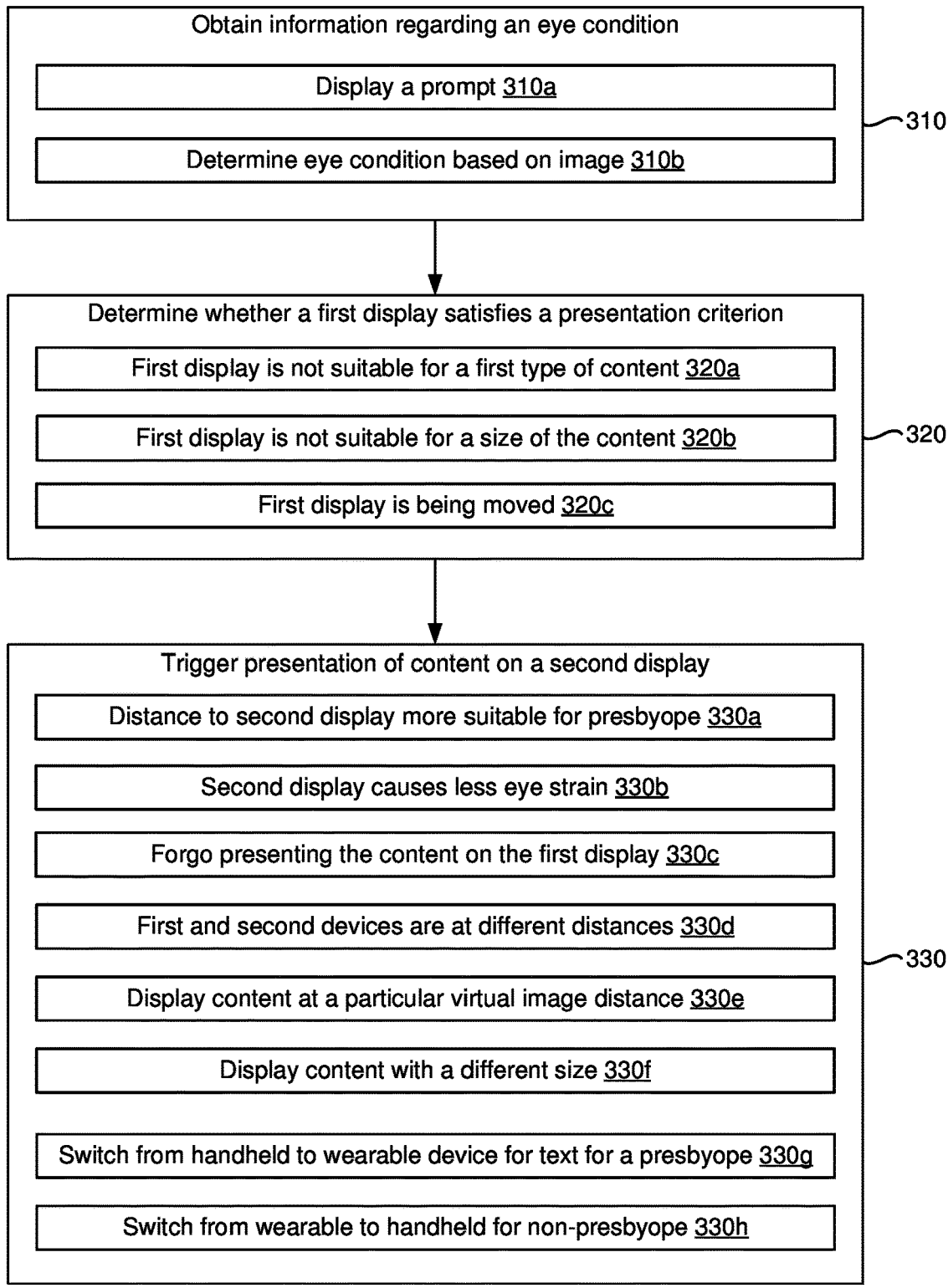
FIG. 3 is a flowchart representation of a method of switching presentation of content between devices in accordance with some implementations.

FIG. 3 is a flowchart representation of a method 300 for switching presentation of content between devices. In various implementations, the method 300 is performed by the content presentation engine 200 shown in FIGS. 1A-2. In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes obtaining information regarding an eye condition. For example, as shown in FIG. 1A, the content presentation engine 200 obtains the eye condition information 50 regarding the person 12. In some implementations, the eye condition includes a first condition of a first eye of a person and a second condition of a second eye of the person. In some implementations, the eye condition includes a long-term condition (e.g., a persistent condition that is expected to last longer than a threshold duration of time, for example, presbyopia that is expected to last for numerous years). Alternatively, in some implementations, the eye condition includes a short-term condition (e.g., a transient condition that is expected to last less than the threshold duration of time, for example, eye fatigue that is expected to last for a few hours).

As represented by block 310a, in some implementations, obtaining the information regarding the eye condition includes displaying a prompt that requests the information regarding the eye condition, and receiving a user input indicating the eye condition. For example, as shown in FIG. 1G, the content presentation engine 200 causes the second electronic device 30 to display the prompt 90, and detects the user input 96 directed to the no affordance 94. In some implementations, the user input indicates whether a person is properly able to view content that is being displayed on a display. In some implementations, the user input includes a series of user inputs that corresponds to a virtual eye examination.

As represented by block 310b, in some implementations, obtaining the information regarding the eye condition includes capturing a set of one or more images of an eye, and determining the eye condition based on the set of one or more images. For example, as shown in FIG. 1F, the content presentation engine 200 receives the image(s) 80 captured by the first image sensor 26 of the first electronic device 20 and/or the second image sensor 36 of the second electronic device 30, and the content presentation engine 200 utilizes the image(s) 80 to determine the eye condition information 50. In some implementations, determining the eye condition based on the set of one or more images includes determining a number of eye blinks. For example, as shown in FIG. 2, in some implementations, the eye condition 212 includes the eye blinking rate 212b. In some implementations, determining the eye condition based on the set of one or more images includes determining an amount of squinting of the eye. For example, as shown in FIG. 2, in some implementations, the eye condition 212 includes the eye squinting amount 212c. In some implementations, determining the eye condition based on the set of one or more images includes determining a difference between respective movements of eyes of a user of the first electronic device. For example, as shown in FIG. 2, in some implementations, the eye condition 212 includes the eye laziness indication 212e that indicates whether one eye is moving a lot more than the other eye.

As represented by block 320, in various implementations, the method 300 includes determining whether a first display of a first electronic device that is presenting content satisfies a presentation criterion based on the eye condition and a characteristic of the content. For example, as discussed in relation to FIGS. 1A and 1B, the content presentation engine 200 determines whether the first display 22 satisfies the presentation criterion 60 based on the eye condition information 50 and the characteristic 72 of the content 70. As another example, as shown in FIG. 2, the presentation determiner 230 determines whether a first one of the displays 250a, 250b, . . . , and 250n that is currently displaying the content 70 satisfies the presentation criterion 60. In some implementations, the characteristic of the content refers to a type of the content (e.g., textual content, image content, video content, etc.). In some implementations, the characteristic of the content refers to a size of the content (e.g., a font size, an image size, a resolution, etc.).

As represented by block 320a, in some implementations, the first display does not satisfy the presentation criterion when the characteristic of the content indicates that the content is of a first type and the second display satisfies the presentation criterion when the characteristic of the content indicates that the content is of the first type. In some implementations, the second display may be more suitable for displaying the first type of content than the first display. For example, the first type of content may be textual content and the second display may be more suitable for displaying the textual content than the first display based on the eye condition. In some implementations, while the first display may not satisfy the presentation criterion for the first type of content, the first display may satisfy a presentation criterion for a second type of content. For example, while the first display may not be suitable for displaying textual content, the first display may be suitable for displaying video content. In some implementations, textual content may have a more stringent presentation criterion than video content. As such, while the content presentation engine may switch the presentation of textual content from the first display to the second display, the content presentation engine may continue displaying video content on the first display.

As represented by block 320b, in some implementations, the first display does not satisfy the presentation criterion when the characteristic of the content indicates that the content has a first size and the second display satisfies the presentation criterion when the characteristic of the content indicates that the content has the first size. As an example, the second display may be more suitable for viewing content of a particular size than the first display. In some implementations, the first display satisfies the presentation criterion when the content is associated with a larger font size or a lower image resolution, and the first display does not satisfy the presentation criterion when the content is associated with a smaller font size or a higher image resolution. As such, while the first display may not satisfy the presentation criterion for content having a first size, the first display may satisfy a presentation criterion for content having a second size that is different from the first size.

As represented by block 320c, in some implementations, the first display does not satisfy the presentation criterion when sensor data indicates that a user of the first electronic device is moving the first electronic device away from the user while holding the first electronic device in order to view the content being presented on the first display. For example, as described in relation to FIG. 2, the eye condition obtainer 210 may utilize the sensor data 220 to determine that the person 12 is moving the first display 250a away from the person 12, and the presentation determiner 230 may determine that the first display 250a does not satisfy the presentation criterion 60 because the presbyopia indication 212a indicates that the person 12 has presbyopia and a distance between the first display 250a and the person 12 is less than the threshold distance 60a.

As represented by block 330, in various implementations, the method 300 includes, in accordance with a determination that the first display does not satisfy the presentation criterion, triggering a second electronic device with a second display that satisfies the presentation criterion to present the content. For example, as shown in FIG. 1B, the content presentation engine 200 triggers the second display 32 of the second electronic device 30 to display the content 70 after determining that the first display 22 does not satisfy the presentation criterion 60.

In various implementations, triggering the second display to display the content allows a person to properly view the content thereby enhancing a user experience provided by the first electronic device and/or the second electronic device. In some implementations, enabling the person to properly view the content reduces a likelihood of erroneous user inputs provided by the person. Reducing erroneous user inputs results in conserving computing resources that would unnecessarily be utilized in detecting, interpreting and responding to the erroneous user inputs thereby prolonging a battery life of the first electronic device and/or the second electronic device.

As represented by block 330a, in some implementations, the information regarding the eye condition indicates that a user of the first electronic device is a presbyope. For example, as shown in FIG. 2, the eye condition 212 may include the presbyopia indication 212a indicating whether the person 12 is a presbyope or a non-presbyope. In some implementations, the first display does not satisfy the presentation criterion when a first distance between the first electronic device and the user is less than a threshold distance. For example, as described in relation to FIG. 2, the first display 250a does not satisfy the presentation criterion 60 when a first distance between the first display 250a and the person 12 is less than the threshold distance 60a. In some implementations, the second display satisfies the presentation criterion when a second distance associated with the second electronic device and the user is greater than the threshold distance. For example, referring to FIG. 2, the second display 250b satisfies the presentation criterion 60 when a second distance between the second display 250b and the person 12 is greater than the threshold distance 60a.

As represented by block 330b, in some implementations, the eye condition indicates a first level of eye strain of a user of the first electronic device while the user is viewing the content on the first display. For example, as shown in FIG. 2, the eye condition 212 may indicate an eye strain level 212d while the person 12 is viewing the content 70 on the first display 250a. In some implementations, the first display does not satisfy the presentation criterion when the first level of eye strain exceeds a threshold level while the user is viewing the content on the first display. For example, as described in relation to FIG. 2, the first display 250a does not satisfy the presentation criterion 60 when the eye strain level 212d is greater than the threshold strain level 60d. In some implementations, the second display satisfies the presentation criterion when a second level of eye strain is below the threshold level while the user is viewing the content on the second display. For example, referring to FIG. 2, the second display 250b satisfies the presentation criterion 60 when an eye strain level of the person 12 while viewing the second display 250b is less than the threshold strain level 60d.

In some implementations, the first level of eye strain includes a first number of eye blinks, the second level of eye strain includes a second number of eye blinks and the threshold level includes a threshold number of blinks. For example, as shown in FIG. 2, the eye condition 212 may indicate the eye blinking rate 212b of the person 12 while viewing the first display 250a. In some implementations, the first display does not satisfy the presentation criterion when the first number of eye blinks exceeds the threshold number of blinks while the user is viewing the content on the first display. For example, as described in relation to FIG. 2, the first display 250a does not satisfy the presentation criterion 60 when the eye blinking rate 212b is greater than the threshold blinking rate 60b. In some implementations, the second display satisfies the presentation criterion when the second number of eye blinks is below the threshold number of eye blinks while the user is viewing the content on the second display. For example, referring to FIG. 2, the second display 250b satisfies the presentation criterion 60 when a blinking rate of the person 12 while viewing the second display 250b is less than the threshold blinking rate 60b.

In some implementations, the first level of eye strain includes a first amount of squinting, the second level of eye strain includes a second amount of squinting and the threshold level includes a threshold amount of squinting. For example, as shown in FIG. 2, in some implementations, the eye condition 212 indicates an eye squinting amount 212c while the person 12 is viewing the content 70 on the first display 250a. In some implementations, the first display does not satisfy the presentation criterion when the first amount of squinting exceeds the threshold amount of squinting while the user is viewing the content on the first display. For example, as described in relation to FIG. 2, the presentation determiner 230 may determine that the first display 250a does not satisfy the presentation criterion 60 when the eye squinting amount 212c is greater than the threshold squinting amount 60c. In some implementations, the second display satisfies the presentation criterion when the second amount of squinting is below the threshold amount of squinting while the user is viewing the content on the second display. For example, referring to FIG. 2, after the content presentation engine 200 switches to presenting the content 70 on the second display 250b, an eye squinting amount while the person 12 is viewing the content 70 on the second display 250b is less than the threshold squinting amount 60c.

In some implementations, the first level of eye strain includes a first difference between respective eye movements, the second level of eye strain includes a second difference between respective eye movements and the threshold level includes a threshold difference between respective eye movements. For example, as shown in FIG. 2, in some implementations, the eye condition 212 indicates an eye laziness indication 212e and the presentation criterion 60 includes a threshold laziness level 60e. In some implementations, the first display does not satisfy the presentation criterion when the first difference exceeds the threshold difference while the user is viewing the content on the first display. For example, as discussed in relation to FIG. 2, in some implementations, the first display 250a does not satisfy the presentation criterion 60 when an eye laziness level exceeds the threshold laziness level 60e. In some implementations, the second display satisfies the presentation criterion when the second difference is below the threshold difference while the user is viewing the content on the second display. For example, with reference to FIG. 2, the second display 250b satisfies the presentation criterion 60 when an eye laziness level while the person 12 is viewing the content 70 on the second display 250b is below the threshold laziness level 60c.

As represented by block 330c, in some implementations, the method 300 includes forgoing presentation of the content on the first display in accordance with the determination that first display does not satisfy the presentation criterion. For example, as shown in FIG. 1C, the content presentation engine 200 causes the first electronic device 20 to cease displaying the content 70 on the first display 22 after determining that the first display 22 does not satisfy the presentation criterion 60. Since the first display 22 does not satisfy the presentation criterion 60, the person 12 is likely not able to view the content 70 on the first display 22. Ceasing display of the content 70 on the first display 22 reduces a power consumption of the first electronic device 20 thereby prolonging a battery life of the first electronic device 20.

As represented by block 330d, in some implementations, the first display does not satisfy the presentation criterion in response to a first distance between the first electronic device and a person with the eye condition breaching a threshold distance and the second display satisfies the presentation criterion in response to a second distance associated with the second electronic device and the person satisfying the threshold distance. For example, as discussed in relation to FIG. 2, the first display 250a does not satisfy the presentation criterion 60 when the presbyopia indication 212a indicates that the person 12 has presbyopia and a first distance between the first display 250a and the person 12 is less than the threshold distance 60a. In this example, the second display 250b satisfies the presentation criterion 60 when the presbyopia indication 212a indicates that the person 12 has presbyopia and a second distance associated with the second display 250b and the person 12 is greater than the threshold distance 60a.

As represented by block 330e, in some implementations, the second display displays the content at a virtual image distance that satisfies the presentation criterion. For example, as shown in FIG. 1D, the second display 32 displays the content 70 at the virtual image distance 34 that is greater than the distance threshold 66. Increasing the virtual image distance allows a person with presbyopia to comfortably view the content being displayed on the second display. Increasing the virtual image distance provides an appearance that the second display is positioned at a distance greater than a threshold distance within which a presbyope may not be able to view the content. As such, increasing the virtual image distance allows the presbyope to view the content. Increasing the virtual image distance provides an appearance that the second display is positioned at a distance that is greater than a physical distance between the second display and the person. Increasing the virtual image distance reduces the need to move the second electronic device in order to increase the physical distance between the second electronic device and the person.

As represented by block 330f, in some implementations, presenting the content on the second display includes changing a size of textual content. For example, as shown in FIG. 1E, the content presentation engine 200 causes the second display 32 to present the modified content 70'. Changing the size of the textual content may include decreasing a text size of the textual content from a large text size to a regular text size when switching from displaying the textual content on a smartphone to an HMD. Since the HMD is positioned much closer to a user than the smartphone, the user will likely be able to read the textual content comfortably with the decreased text size and the HMD will be able to display more of the textual content. Displaying a larger portion of the textual content on a single screen reduces a number of user inputs associated with switching pages. Reducing user inputs tends to conserve computing resources associated with detecting, interpreting and responding to unnecessary user inputs.

As represented by block 330g, in some implementations, the eye condition indicates that a user of the first electronic device has presbyopia, the type of content is textual content, the first electronic device is a smartphone, the second electronic device is an HMD where the virtual image distance can be increased to provide an appearance that the textual content is being displayed farther than a distance between the user and the HMD. For example, referring to FIG. 1D, in response to the eye condition information 50 indicating that the person 12 is a presbyope, the content presentation engine 200 switches the presentation of the content 70 from the first electronic device 20 that may be a smartphone to the second electronic device 30 that may be an HMD.

As represented by block 330h, in some implementations, the eye condition indicates that a user of the first electronic device does not have presbyopia, the type of content is textual content, the first electronic device is an HMD and the second electronic device is a smartphone. For example, referring to FIG. 1B, in response to the eye condition information 50 indicating that the person 12 is a presbyope, the content presentation engine 200 switches the presentation of the content 70 from the first electronic device 20 that may be an HMD to the second electronic device 30 that may be a smartphone.

Figure 4:
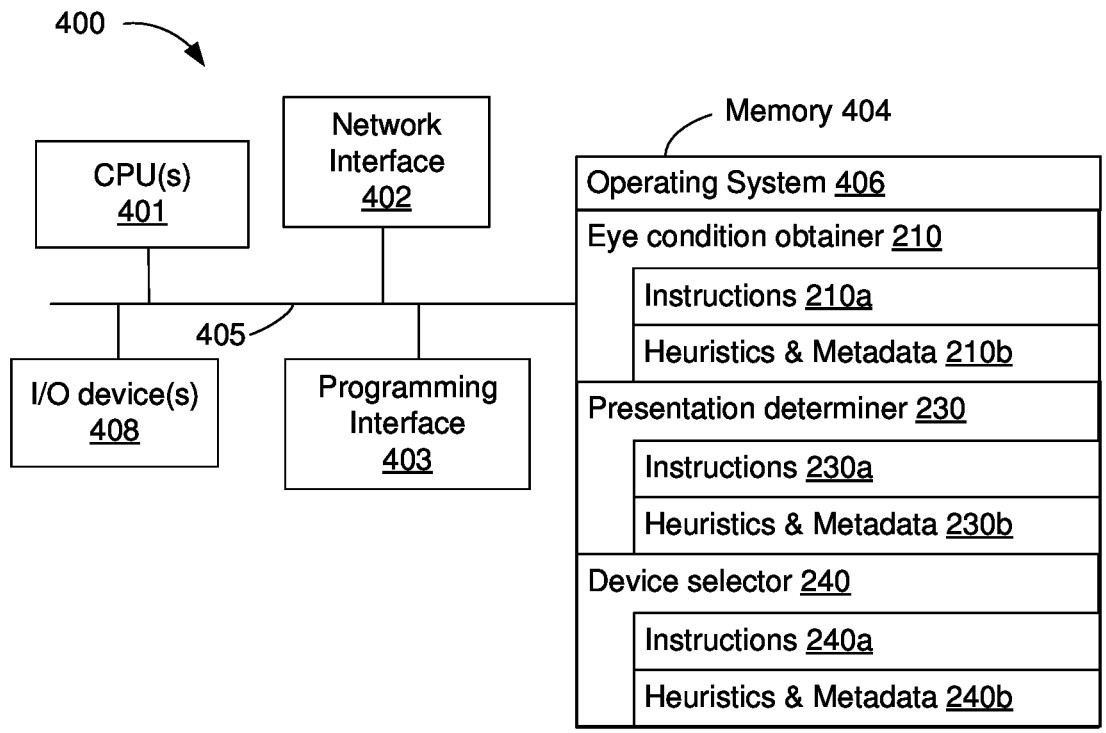
FIG. 4 is a block diagram of a device that switches presentation of content between devices in accordance with some implementations.

FIG. 4 is a block diagram of a device 400 in accordance with some implementations. In some implementations, the device 400 implements the first electronic device 20 shown in FIGS. 1A-1G, the second electronic device 30 shown in FIGS. 1A-1G and/or the content presentation engine 200 shown in FIGS. 1A-2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 408, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the one or more I/O devices 408 include a display for displaying content (e.g., the content 70 shown in FIGS. 1A-2). In some implementations, the display includes an XR display. In some implementations, the display includes an opaque display. Alternatively, in some implementations, the display includes an optical see-through display. In some implementations, the one or more I/O devices 408 include an eye tracker that obtains information regarding an eye condition (e.g., the eye condition information 50 shown in FIGS. 1A-1G and/or the eye condition 212 shown in FIG. 2). In some implementations, the eye tracker includes an image sensor (e.g., a camera, for example, a visible light camera or an infrared light (IR) camera) that captures an image of an eye of a user of the device 400 (e.g., the image(s) 80 shown in FIG. 1F and/or the image(s) 214 shown in FIG. 2). In some implementations, the one or more I/O devices 408 include a sensor for capturing sensor data (e.g., the sensor data 220 shown in FIG. 2). In some implementations, the sensor includes a movement sensor that detects a movement of a device relative to a person (e.g., the movement sensor detects the movement of the first electronic device 20 relative to the person 12 shown in FIG. 1A, for example, the movement sensor detects that the person 12 is moving the first electronic device 20 away from him/her). In some implementations, the movement sensor includes an inertial measurement unit (IMU).

In some implementations, the memory 404 or the non-transitory computer readable storage medium of the memory 404 stores the following programs, modules and data structures, or a subset thereof including an optional operating system 406, the eye condition obtainer 210, the presentation determiner 230 and the device selector 240. In various implementations, the eye condition obtainer 210 includes instructions 210a, and heuristics and metadata 210b for obtaining information regarding an eye condition (e.g., the eye condition information 50 shown in FIGS. 1A-1G and/or the eye condition 212 shown in FIG. 2). In various implementations, the presentation determiner 230 includes instructions 230a, and heuristics and metadata 230b for determining whether a first display currently presenting content satisfies a presentation criterion. In various implementations, the device selector 240 includes instructions 240a, and heuristics and metadata 240b for triggering a second display to display the content in response to the presentation determiner 230 determining that the first display does not satisfy the presentation criterion. In various implementations, the device 400 performs the method 300 shown in FIG. 3.

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

As described above, one aspect of the present technology is the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve visibility of virtual content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:
   obtaining information regarding an eye condition;
   while a first display of a first electronic device is presenting content, determining whether the first display of the first electronic device satisfies a presentation criterion based on the eye condition and a characteristic of the content;
   while the first display of the first electronic device is presenting the content, determining whether a second display of a second electronic device satisfies the presentation criterion based on the eye condition and the characteristic of the content; and
   in accordance with a determination that the first display does not satisfy the presentation criterion for at least a portion of the content and the second display does satisfy the presentation criterion, causing the second electronic device to present the portion of the content while maintaining presentation of a remainder of the content at the first display.

2. The method of claim 1, wherein obtaining the information regarding the eye condition comprises:
   displaying a prompt that requests the information regarding the eye condition; and
   receiving a user input indicating the eye condition.

3. The method of claim 1, wherein obtaining the information regarding the eye condition comprises:
   capturing a set of one or more images of an eye; and
   determining the eye condition based on the set of one or more images.

4. The method of claim 3, wherein determining the eye condition based on the set of one or more images comprises determining the eye condition based on a number of eye blinks.

5. The method of claim 3, wherein determining the eye condition based on the set of one or more images comprises determining the eye condition based on an amount of squinting of the eye.

6. The method of claim 3, wherein determining the eye condition based on the set of one or more images comprises determining the eye condition based on a difference between respective movements of eyes of a user of the first electronic device.

7. The method of claim 1, wherein the information regarding the eye condition indicates that a user of the first electronic device is a presbyope;
   wherein the first display does not satisfy the presentation criterion when a first distance between the first electronic device and the user is less than a threshold distance; and
   wherein the second display satisfies the presentation criterion when a second distance between the second electronic device and the user is greater than the threshold distance.

8. The method of claim 1, wherein the eye condition indicates a first level of eye strain of a user of the first electronic device while the user is viewing the content on the first display;
   wherein the first display does not satisfy the presentation criterion when the first level of eye strain exceeds a threshold level while the user is viewing the content on the first display; and
   wherein the second display satisfies the presentation criterion when a second level of eye strain is below the threshold level while the user is viewing the content on the second display.

9. The method of claim 8, wherein the first level of eye strain includes a first number of eye blinks, the second level of eye strain includes a second number of eye blinks and the threshold level includes a threshold number of blinks;
   wherein the first display does not satisfy the presentation criterion when the first number of eye blinks exceeds the threshold number of blinks while the user is viewing the content on the first display; and
   wherein the second display satisfies the presentation criterion when the second number of eye blinks is below the threshold number of eye blinks while the user is viewing the content on the second display.

10. The method of claim 8, wherein the first level of eye strain includes a first amount of squinting, the second level of eye strain includes a second amount of squinting and the threshold level includes a threshold amount of squinting;
    wherein the first display does not satisfy the presentation criterion when the first amount of squinting exceeds the threshold amount of squinting while the user is viewing the content on the first display; and
    wherein the second display satisfies the presentation criterion when the second amount of squinting is below the threshold amount of squinting while the user is viewing the content on the second display.

11. The method of claim 8, wherein the first level of eye strain includes a first difference between respective eye movements, the second level of eye strain includes a second difference between respective eye movements and the threshold level includes a threshold difference between respective eye movements;
    wherein the first display does not satisfy the presentation criterion when the first difference exceeds the threshold difference while the user is viewing the content on the first display; and wherein the second display satisfies the presentation criterion when the second difference is below the threshold difference while the user is viewing the content on the second display.

12. The method of claim 1, wherein the first display does not satisfy the presentation criterion when the characteristic of the content indicates that the content is of a first type and the second display satisfies the presentation criterion when the characteristic of the content indicates that the content is of the first type.

13. The method of claim 1, wherein the first display does not satisfy the presentation criterion when the characteristic of the content indicates that the content has a first size and the second display satisfies the presentation criterion when the characteristic of the content indicates that the content has the first size.

14. The method of claim 1, further comprising forgo presenting content on the first display in accordance with the determination that first display does not satisfy the presentation criterion.

15. The method of claim 1, wherein the first display does not satisfy the presentation criterion in response to a first distance between the first electronic device and a person with the eye condition breaching a threshold distance and the second display satisfies the presentation criterion in response to a second distance between the second electronic device and the person satisfying the threshold distance.

16. The method of claim 1, wherein the first display does not satisfy the presentation criterion when sensor data indicates that a user of the first electronic device is moving the first electronic device away from the user while holding the first electronic device in order to view the content being presented on the first display.

17. The method of claim 1, wherein the second display displays the content at a virtual image distance that satisfies the presentation criterion.

18. The method of claim 1, wherein presenting the content on the second display comprises changing a size of textual content.

19. A device comprising:
a display;
an eye tracker;
one or more processors;
a non-transitory memory; and
one or more programs stored in the non-transitory memory, which, when executed by the one or more processors, cause the device to:
obtain information regarding an eye condition;
while a first display of a first electronic device is presenting content, determine whether the first display of the first electronic device satisfies a presentation criterion based on the eye condition and a characteristic of the content;
while the first display of the first electronic device is presenting the content, determine whether a second display of a second electronic device satisfies the presentation criterion based on the eye condition and the characteristic of the content; and
in accordance with a determination that the first display does not satisfy the presentation criterion for at least a portion of the content and the second display does satisfy the presentation criterion, cause the second electronic device to present the portion of the content while maintaining presentation of a remainder of the content at the first display.

20. A non-transitory memory storing one or more programs, which, when executed by one or more processors of a device with an eye tracker and a display, cause the device to:
obtain information regarding an eye condition;
while a first display of a first electronic device is presenting content, determine whether the first display of the first electronic device satisfies a presentation criterion based on the eye condition and a characteristic of the content;
while the first display of the first electronic device is presenting the content, determine whether a second display of a second electronic device satisfies the presentation criterion based on the eye condition and the characteristic of the content; and
in accordance with a determination that the first display does not satisfy the presentation criterion and the second display does satisfy the presentation criterion for at least a portion of the content, cause the second electronic device to present the portion of the content while maintaining presentation of a remainder of the content at the first display.

* * * * *